United States Patent Office 3,331,879
Patented July 18, 1967

3,331,879
SELECTIVE ORTHO-ALKYLATION PROCESS
Gerd Leston, Pittsburgh, Pa., assignor to Koppers
Company, Inc., a corporation of Delaware
No Drawing. Filed Dec. 16, 1965, Ser. No. 514,400
8 Claims. (Cl. 260—624)

This invention relates to the alkylation of hydroxyaromatic hydrocarbons. In one specific aspect, it relates to the selective alkylation of hydroxyaromatic hydrocarbons, particularly phenols, in a ring position ortho- to the hydroxyl group. This application is a continuation-in-part of my co-pending application Ser. No. 301,876, filed Aug. 13, 1963, now abandoned.

Conventional methods of alkylation, such is Friedel-Crafts alkylation, result in a more or less random introduction of alkyl groups onto the ring of aromatic hydrocarbons, with any preferential alkylation resulting from the steric configuration of the particular hydroxyaromatic hydrocarbon being alkylated. Friedel-Crafts alkylation involves reacting an aromatic hydrocarbon with a halogenated aliphatic hydrocarbon in the presence of e.g., aluminum chloride. In addition to providing a non-specific distribution of the various alkylated isomers, the Friedel-Crafts alkylation process suffers the additional disadvantage of the rearrangement of the carbon skeleton when branched chain hydrocarbons are introduced.

A great step forward in the alkylation art was made by George G. Ecke and Alfred J. Kolka, who found that certain metal aryloxides were efficient for the selective ortho-alkylation of phenolic bodies when used as described in U.S. Patent No. 2,831,898. In their patent Ecke et al. describe the selective ortho-alkylation of phenols using the phenoxy derivatives of such elements as aluminum, magnesium, iron, zinc, phosphorus, arsenic, antimony, bismuth and tin.

The pioneer work of Ecke and Kolka created the illusion that a simple choice of a desired metal phenolate was the key to all of the problems of selective ortho-alkylation. Unfortunately, this hope has not been realized. The metal phenolates (or aryloxides), when used as alkylation catalysts, behave in the unpredictable manner typical of most catalyst systems. Of the phenoxy derivatives included in the Ecke et al. patent, only aluminum phenoxide is an excellent catalyst for ortho-alkylation. Magnesium phenoxide is good, and zinc phenoxide is acceptable. The phenoxides of the other metals specifically named by Ecke and Kolka show a mediocre to poor performance as selective ortho-alkylation catalysts.

The use of metal aryloxides as ortho-alkylation catalysts has engendered numerous problems that were unforeseen at the time of their introduction to the art. With respect to the performance of the catalyst, there has been an increasing demand for catalysts capable of providing higher and higher selectivity, as determined by the ratio of ortho- to para-isomers present in the final product. Aluminum phenoxide, which is regarded as an excellent ortho-alkylation catalyst, provides, in many instances, a product mixture having an o/p ratio of 15:1 to 40:1. Less effective phenoxides, such as zinc phenoxide, provide an o/p ratio of only 2:1 to 4:1.

Reaction time, of course, is an important commercial consideration. Many of the metal aryloxides named by Ecke et al. are so sluggish in their behavior that the required reaction time becomes prohibitive. Other important considerations include the stability of the catalyst, particularly to moisture, ease of catalyst recovery, and effectiveness of the catalyst on repeated recycle.

Prior attempts to find metal phenoxides useful for selective ortho-alkylation other than those named by Ecke and Kolka, have met with uniform lack of success. It was believed, based on experience with titanium phenoxide and vanadium phenoxide, that the Group IV–B and Group V–B metal oxides were completely ineffective as alkylation catalysts. Titanium phenoxide, as shown in comparative Example II, after one-half hour, showed only a 2.6 percent concentration of ortho - alpha - methylbenzylphenol when used for styrenation of phenol, a relatively simple alkylation. Even after one and one-half hours, the concentration of ortho-alpha-methylbenzylphenol had only increased to 6.5 percent. Vanadium phenoxide, as shown in comparative Example XXI, after three hours, showed only a 9.3 percent concentration of ortho-alpha-methylbenzylphenol when used for styrenation of phenol. Even after 3.67 hours, the concentration of ortho-alpha-methylbenzylphenol increased to only 9.5 percent, and the o/p ratio of very poor.

I have discovered that, unexpectedly, the aryloxides of metals of the 5th and 6th periods of Group IV–B and Group V–B of the Periodic Table, are outstanding selective ortho-alkylation catalysts, even surpassing aluminum phenoxide in many aspects of its performance. Surprisingly, phenoxides of metals of the 5th and 6th periods of Group IV–B and V–B give product mixtures having an o/p ratio in excess of 100:1, a degree of selectivity not heretofore obtainable by any reported method.

It is, therefore, an object of the present invention to provide a new and economical selective ortho-alkylation process resulting in measurably improved selectivity of ortho-alkylation.

In accordance with the invention, a hydroxyaromatic hydrocarbon containing at least one reactive hydrogen in a ring position ortho- to a hydroxyl group is reacted with an olefin at an elevated temperature and a pressure up to 3,000 p.s.i.g. in the presence of a catalytic amount of an aryloxide of a metal of the 5th and 6th periods of the Group IV–B and Group V–B metals.

The metals of the 5th and 6th periods of the Group IV–B and V–B elements useable in the present invention are zirconium, niobium, hafnium, and tantalum. These metals are classified according to their appearance in the Periodic Table of the Elements, E. H. Sargent & Co., S–18806, Catalogue No. 113, 1964.

The hydroxyaromatic hydrocarbons useful in the invention include all of those conventionally subjected to the alkylation reactions of the heretofore-known art. The hydroxyaromatic hydrocarbon can be mono- or polynuclear and also mono- or polyhydroxy; most commonly they are the hydroxybenzenes, hydroxynaphthalenes, bisphenols and their lower alkyl-, phenyl-, benzyl-, halo- and amino-substituted derivatives. Useful starting materials thus include phenol, o-cresol, m-cresol, p-cresol, o-, m-, and p-chlorophenol, 2,5-dichlorophenol, thymol, m-ethylphenol, p-t-butylphenol, carvacrol, mono-bromo-carvacrol, catechol, resorcinol, pyrogallol, alpha-naphthol, mono-chloro-beta-naphthol, o-phenylphenol, p-phenylphenol, alpha-anthrol, o-, m-, and p-aminophenol, guaiacol, anol, eugenol, and isoeugenol.

The olefins useful for alkylation according to the invention also include all of those commonly known to the alkylation art; in particular, mono- or polyolefins, cycloolefins, aryl-substituted olefins, and halo-substituted olefins. Conventional alkylating agents are those having up to 8–12 carbon atoms, although high molecular weight olefins up to those containing about 20 carbon atoms can be used. Useful olefins thus include ethylene, propylene, butylene, isobutylene, amylene, isoamylene, hexene, heptene, butadiene, isoprene, chloroprene, 1-chlorobutadiene, diisobutylene, heptadiene, octene, decene, dodecene, hexadecene, octadecene, eicosene, styrene, alpha-methylstyrene, 2-phenylpropene-1, 2-phenylbutene-1, and the like. Suitable mixtures of olefins may also be used to practice the invention.

The catalysts used in the invention are aryloxides of the 5th and 6th periods of Group IV–B and Group V–B metals, such as phenoxides, m-toloxides, p-toloxides, catecholates, xylenoxides, naphthoxides, m-chlorophenoxides, m-bromophenoxides, ethylphenoxides, isopropylphenoxides, and resorcinolates. These catalysts are preferably made by reacting tetrahalides such as tetrachlorides, hydroxides, or alkoxides such as ethoxides, isopropoxides, or butoxides, with a hydroxyaromatic hydrocarbon, such as phenol, a halophenol, a naphthol, a polyhydroxy phenol or a lower alkyl phenol. Conveniently, the phenol used in the formation of the metal aryloxide is that being subjected to alkylation in the process of the invention, or one of those which is obtained as an alkylation product.

The catalyst may be pre-formed or it may be formed in situ. To pre-form the catalyst a sufficient quantity of metal tetrahalide and either a stoichiometric quantity or an excess of the desired hydroxyaromatic hydrocarbon, e.g., phenol, m-cresol, p-cresol, or various alkylated, halogenated or aminated phenols, cresols or naphthols, are heated together at an elevated temperature of, for example, 60–250° C. As I have noted hereabove, alkoxides or hydroxides can be used in place of the tetrahalides to form the metal aryloxide. The catalyst is formed in situ by adding sufficient quantities of the metal of the 5th and 6th period of Group IV–B and V–B metal compound and the hydroxyaromatic compound to the reaction mixture prior to alkylation. If the catalyst to be used is the aryloxide of the hydroxyaromatic compound to be alkylated or one of the intermediate products of alkylation, it is necessary simply to add a sufficient quantity of metal compound to the reaction mixture.

The amount of catalyst used generally ranges between about 0.05 and 25 mole percent, based on the number of moles of the material to be alkylated. Although the preferred amount of catalyst varies to some extent with the degree of alkylation desired, if less than 0.05 mole percent catalyst is used, alkylation is quite slow. For economic reasons no advantage is seen in using more than 25 mole percent catalyst, although no adverse effects are obtained thereby. I prefer to use between about 0.2 and 10 mole percent catalyst for each of reaction and economical operation.

The alkylation reaction is exothermic. It proceeds smoothly at elevated temperatures as low as 50° C. up to the boiling point of the reaction mixture under the particular pressure applied. Most alkylation reactions can be run at temperatures between 50 and 400° C., preferably between 125 and 300° C.

The reaction is run at pressures ranging from atmospheric pressure up to about 3000 p.s.i.g. For the simple alkylations, for example, the alkylation of phenol or cresol with isobutylene or styrene, the reaction proceeds well at atmospheric pressure or low positive pressures and, from the standpoint of equipment costs, the use of these low pressures is most desirable. The more difficult alkylations involving, for example, alkylation with ethylene, high positive pressures in the range of 1200 to 3000 p.s.i.g. are required. It is obviously advantageous for economic reasons to run the reaction at the lowest convenient pressure. The degree of alkylation depends upon the number of alkylatable positions on the hydroxyaromatic hydrocarbon and the mole ratio of the reactants. Mono-alkylations can be accomplished using from about 0.3–1.2 moles of olefin per mole of hydroxyaromatic compound. It is often convenient, from the standpoint of avoiding dealkylation, to use considerably less than the stoichiometric quantity of olefin. In this case a high ultimate yield of monoalkylated product is obtained by recycle. The use of 0.3–0.7 mole of olefin, accompanied by recycle, is desirable from the standpoint of obtaining a maximum ultimate yield of monoalkylated product. Dialkylated products are obtained according to the invention by using 1.3–2.5 moles of olefin per mole of hydroxyaromatic hydrocarbon. The lower mole ratios within the indicated range are used when it is desired to avoid the formation of trialkylated products.

The reaction time can be conveniently determined by measuring the amount of olefin absorbed by the reaction mixture. Alternatively, the reaction mixture may be repeatedly sampled and the constitution of the samples can be determined by vapor phase chromatography, as shown in the examples that follow.

Conveniently, alkylation is conducted in the absence of a solvent, although, if desired, any solvent which is inert to the reactants and catalyst under the conditions of the reaction can be employed. Suitable solvents include benzene, toluene, xylene, Tetralin, Decalin, hexane, heptane, cyclohexane, and the like.

The reaction product of the invention, although primarily a mono-ortho- or di-ortho- (depending upon the reaction conditions and mole ratio of ingredients) hydroxyaromatic hydrocarbon, also contains unreacted starting material and minor percentages of other isomers.

The operation can be conducted batch-wise or continuously, as desired. Unreacted starting materials and catalyst may be recycled for use in a subsequent run.

The compounds made by the process of my invention have well established uses in the art, such as monomers for phenolic resins, detergent intermediates, germicides, polymerization inhibitors, antioxidants, and the like.

My invention is further illustrated by the following examples:

EXAMPLE I

*Styrenation of phenol with zirconium phenoxide catalyst*

A mixture composed of 12.8 g. of 30 percent tetrabutyl zirconate (in xylene, corresponding to 3.83 g. or 10 mmoles of the pure compound), 100 g. (1.06 moles) of phenol, and 5 ml. of xylene (4.0 g.) was distilled in a 15 in. glass helix-packed column at atmospheric pressure. There was collected 8.6 g. (9.1 ml.) of distillate boiling at 114–136° C. Of this, about 0.1 to 0.2 g. was water. To the distillation residue, which was heated to 150° C. with stirring, 100 g. of styrene was added dropwise over 17 minutes. At the end of this time, the temperature had risen to 206° C. and the first sample was withdrawn. Additional samples were taken at 0.25, 0.5, 1.0, 1.5, 2.6, 3.0, 5.0, and 6.5 hours after completion of the addition while the temperature dropped from a high of 210° C. to 177° C. about one hour after completion and remained there. The reaction was stopped and the mixture was allowed to cool.

After treatment with solid sodium carbonate and dilution with benzene, the samples were analyzed by vapor phase chromatography with the following results:

| Compound | Sample | | |
|---|---|---|---|
| | 1 | 2 | 3 |
| | Reaction Time (Hours) (After Addition) | | |
| | 0 | 0.5 | 1.5 |
| | Area Percent | | |
| Styrene | 5.3 | 1.8 | 1.1 |
| Phenol | 14.8 | 20.1 | 18.7 |
| o-(α-methylbenzyl)phenol | 61.9 | 64.2 | 60.5 |
| p-(α-methylbenzyl)phenol | 1.5 | 0.9 | 0.8 |
| 2,6-bis(α-methylbenzyl)phenol | 11.7 | 10.3 | 12.4 |
| 2,4-bis(α-methylbenzyl)phenol | 4.7 | 2.7 | 6.5 |

The o/p ratio was about 75:1 and the maximum ultimate yield of o-α-methylbenzylphenol by recycle was 87 percent, based on phenol.

EXAMPLE II

*Styrenation of phenol with titanium phenoxide catalyst*

A mixture of 3.40 g. (10 mmoles) of tetrabutyl titanate, 100 g. of phenol and 10 ml. of xylene was distilled in a 15 in. glass helix-packed column at atmospheric pressure. There was collected 7.8 g. (9.4 ml.) boiling at 116–135° C. Of this, about 0.2 g. was water. After removal of the water, the rest was dried ($Na_2SO_4$) and analyzed by vapor phase chromatography. Duplicate determinations showed 38.8 and 39.5 percent butanol, corresponding to a recovery of 2.96 g. (39 percent×7.6 g.), or 100 percent of theory. To the distillation residue which was heated to 150° C. with stirring, 100 g. of styrene was added dropwise over nine minutes. At the end of this time, the temperature had dropped to 129° C. and the first sample was withdrawn. An additional sample was taken one-half hour after completion of the addition, while the temperature rose to 150° C. The reaction was stopped and the mixture was allowed to cool after 1.5 hours.

After treatment with solid sodium carbonate and dilution with benzene, the samples were analyzed by vapor phase chromatography with the following results:

| Compound | Sample | | |
|---|---|---|---|
| | 1 | 2 | 3 |
| | Reaction Time (Hours) (After Addition) | | |
| | 0 | 0.5 | 1.5 |
| | Area Percent | | |
| Styrene | 53.7 | 51.0 | 45.0 |
| Phenol | 46.3 | 44.5 | 45.7 |
| Unknown I | 0 | 1.2 | 2.0 |
| o-(α-methylbenzyl)phenol | 0 | 2.6 | 6.5 |
| Unknown II | 0 | 0.7 | 0.8 |
| p-(α-methylbenzyl)phenol | 0 | 0 | 0 |
| 2,6-bis(α-methylbenzyl)phenol | 0 | 0 | 0 |
| 2,4-bis(α-methylbenzyl)phenol | 0 | 0 | 0 |

It is thus seen that titanium phenoxide is ineffective as an ortho-alkylation catalyst.

EXAMPLE III

*Distyrenation of phenol*

The general procedure of Example I was repeated using sufficient styrene to obtain distyrenation. A total of 9.25 g. (11.1 ml.) was distilled at 114–136° C. The residue was stirred at 165° C. and 200 g. (1.92 moles, styrene/phenol mole ratio 1.8) of styrene was added during 13 minutes at this temperature. A sample was taken at this point and also during subsequent stirring after 0.25, 0.5, 1.0 and 1.33 hours while the temperature rose to 217° C. (always at constant heat input). The samples were treated with solid sodium carbonate, diluted with benzene and analyzed by vapor phase chromatography (any tri-α-methylbenzylphenol present was not measured).

| Compound | Sample | | | | |
|---|---|---|---|---|---|
| | 1 | 2 | 3 | 4 | 5 |
| | Reaction Time (Hours) (After Addition) | | | | |
| | 0 | 0.25 | 0.5 | 1.0 | 1.33 |
| | Area Percent | | | | |
| Styrene | 51.6 | 35.1 | 28.9 | 21.5 | 12.0 |
| Phenol | 8.7 | Trace | 0 | 0 | 0 |
| o-(α-methylbenzyl)phenol | 34.1 | 47.6 | 46.3 | 48.3 | 48.2 |
| p-(α-methylbenzyl)phenol | 0 | 0 | 0 | 0 | 0 |
| 2,6-bis(α-methylbenzyl)phenol | 4.5 | 14.1 | 19.6 | 36.2 | 34.2 |
| 2,4-bis(α-methylbenzyl)phenol | 1.1 | 3.1 | 5.2 | 3.9 | 5.6 |

The o/p ratio was infinite and the maximum ultimate yield of 2,6-bis(α-methylbenzyl)phenol by recycle of the o-(α-methylbenzyl)phenol was 90.3 percent.

EXAMPLE IV

*Distyrenation of phenol*

The general procedure of Example II was repeated with the exception that the amount of styrene was increased to 221 g. (2.12 moles) to obtain a styrene/phenol mole ratio of 2.0. The styrene addition took place at a lower temperature, starting at 158° C. and ending at 135° C. 19 minutes later. Stirring was continued and samples were taken after 0.25, 0.5, 1, 2, 3, 4, 5 and 6 hours, while the temperature rose slowly to about 200° C.

The samples were treated in the usual manner before vapor phase chromatographic analysis.

| Compound | Sample | | | | | | | | |
|---|---|---|---|---|---|---|---|---|---|
| | 1 | 2 | 3 | 4 | 5 | 6 | 7 | 8 | 9 |
| | Reaction Time (Hrs.) (After Addition) | | | | | | | | |
| | 0 | 0.25 | 0.5 | 1 | 2 | 3 | 4 | 5 | 6 |
| | Area Percent | | | | | | | | |
| Styrene | 64.8 | 67.6 | 60.8 | 43.2 | 27.0 | 15.2 | 11.8 | 5.0 | 3.0 |
| Phenol | 26.6 | 17.8 | 13.2 | 3.4 | 0 | 0 | 0 | 0 | 0 |
| o-(α-methylbenzyl)phenol | 7.6 | 13.6 | 23.8 | 39.2 | 41.7 | 41.5 | 36.9 | 37.5 | 37.6 |
| p-(α-methylbenzyl)phenol | 0 | 0 | 0 | 0 | 0 | 0 | 0 | 0 | 0 |
| 2,6-bis(α-methylbenzyl)phenol | 0.9 | 0.5 | 2.1 | 10.3 | 24.9 | 34.7 | 43.9 | 48.4 | 50.6 |
| 2,4-bis(α-methylbenzyl)phenol | 0 | 0 | 0 | 3.9 | 6.4 | 8.5 | 7.6 | 9.2 | 8.7 |

The o/p ratio was infinite and the maximum ultimate yield of 2,6-bis(α-methylbenzyl)phenol was 85 percent.

EXAMPLE V

Isopropylation of m-cresol

Tetraisopropyl zirconate, 32.7 g. (0.10 mole) was added to a mixture of m-cresol, 1046 g. (9.70 moles) and xylene, 50 ml. The mixture was distilled at atmospheric pressure to remove isopropyl alcohol. The residue containing ca. 5 percent zirconium m-toloxide by weight was charged to a one-gallon stirred autoclave and heated to 230° C. About 250 g. (6.0 moles) of propylene was absorbed during 4.5 hours at 230–240° C. at 150–170 p.s.i.g. The reaction mixture was heated to 275° C. and the product isomerized during eight hours. Gas chromatographic analysis of the final product showed thymol, 42.5 percent (by weight); m-cresol, 38 percent; 2-isopropyl-3-methylphenol, 4 percent; 4-isopropyl-3-methylphenol, 6 percent; and diisopropylated m-cresol, 5 percent. A weighed portion of the reaction mixture, 508 g., heated with 50 percent aqueous caustic to neutralize the catalyst was distilled through a two-foot stainless-steel helix-packed column at 50 mm. Hg. There were recovered 1.5 percent forerunnings at 30–115° C., 34.8 percent of 99 percent m-cresol at 115–125° C., 1.9 percent of intermediate containing 55 percent m-cresol, 22 percent 2-isomer and 19 percent thymol, at 125–139° C., 44.9 percent thymol fraction of 89 percent purity with 9.5 percent 2-isomer and 1.5 percent m-cresol at 139–148° C. and 2.5 percent higher boiling intermediate containing 14 percent thymol. The conversion to pure thymol based on these results was 37 percent conversion and the ultimate yield 80 percent.

EXAMPLE VI

Isopropylation of m-cresol

A 30 percent xylene solution of tetrabutyl zirconate, 211 g. (corresponding to 0.165 mole), was added to 1100 g. (10.2 moles) of m-cresol. The mixture was distilled at 200 mm. Hg to remove xylene and n-butyl alcohol. The residue, 1113 g., containing 7.7 percent by weight of zirconium m-toloxide, was reacted with 230 g. (5.5 moles) of propylene in an autoclave at 230° C. and 150 p.s.i.g. The mixture was then heated at 275° C. and sampled periodically during eight hours while the pressure dropped from 150 to 50 p.s.i.g. Gas chromatographic analyses indicated reaction mixture remained essentially unchanged after three hours. A 552 g. sample of final product (49.5 percent thymol, 45.4 percent m-cresol, 2 percent each of 2-isomer, 4-isomer and diisopropyl-m-cresol) was treated with 50 percent aqueous caustic to neutralize the catalyst and distilled at 50 mm. Hg in a stainless-steel helix-packed column to give 39.8 percent m-cresol (99 percent pure), boiling at 120–125° C., 0.7 percent intermediate boiling at 125–135° C. and containing 45 percent m-cresol and 29 percent thymol and 53.4 percent of a higher boiling fraction (B.P. >135° C.) containing 2.5 percent m-cresol, 1.6 percent 2-isomer, 83.5 percent thymol, 3.3 percent 5-isomer, 4.4 percent 4-isomer and 5.8 percent diisopropyl-m-cresol. The conversion to thymol based on these results was 40 percent and the ultimate yield was 80 percent.

EXAMPLE VII sec-Butylation of phenol

Phenol, 1000 g. (10.6 moles) was dried by azeotropic distillation with xylene. Zirconium tetrachloride, 25.1 g. (0.108 mole) was added and the mixture was refluxed for 48 hours under a slow stream of nitrogen. The product, 995 g. was charged to a one-gallon stirred autoclave and heated to 230° C. 1-butene, 320 g. (5.7 moles), was added under nitrogen pressure (total pressure, 120 p.s.i.g.) during four hours. The product was discharged and analysis showed phenol 39.0 percent, o-sec-butylphenol 57.2 percent, and di-sec-butylphenol 3.8 percent. The alkylate, 1291 g., was neutralized with 50 percent sodium hydroxide and fractionally distilled at 50 mm. Hg to give 35.7 percent of 98.5 percent phenol boiling at 101–106° C., 1.7 percent of intermediate boiling at 107–136° C. and containing 25.7 percent phenol, and 69.2 percent o-sec-butylphenol, 50.7 percent of o-sec-butylphenol and 98.7 percent purity and boiling at 136–150° C., and finally 0.6 percent of a higher boiling fraction, 150–164° C., containing 9.7 percent of o-sec-butylphenol. The above results correspond to a 42 percent conversion to o-sec-butylphenol and an ultimate yield of 80 percent.

EXAMPLE VIII t-Butylation of phenol

A mixture of phenol and 5 percent (by weight) of zirconium phenoxide, 910 g. (9.2 moles of phenol) was reacted with isobutylene during four hours at 135–140° C. and 35–45 p.s.i.g. Gas chromatographic analysis of the final product showed phenol, 9.0 percent; o-t-butylphenol, 76.0 percent; p-t-butylphenol, 1.5 percent; di-t-butylphenols, 13.0 percent and 2,4,6-tri-t-butylphenol 0.5 percent. These figures correspond to a 75 percent conversion to o-t-butylphenol and an 87 percent ultimate yield.

EXAMPLE IX

Alkylation of phenol with butadiene

Phenol, containing 5 percent by weight of zirconium phenoxide, 1065 g., was heated at 150° C. in a one-gallon autoclave. Butadiene, 370 g., was admitted (pressure 30 p.s.i.g.) and the reaction was stopped after six hours. Gas chromatographic analysis showed phenol, 52.6 percent; three unidentified, 11.9 percent; o-butenylphenol, 22.1 percent; and two more unidentified, 13.2 percent. The yield of o-butenylphenol based on the analysis is 47 percent.

EXAMPLE X

Alkylation of phenol with 1-decene

Phenol, containing 5 percent by weight of zirconium phenoxide (1010 g. total, 10.2 moles of phenol), was reacted with 700 g. (4.0 moles) of 1-decene in a one-gallon autoclave at 300° C. during four hours.

Analysis of the product by gas chromatography indicated phenol, 38 percent; o-(α-methylnonyl)phenol, 57 percent; and higher boiling components, 5 percent. Base was added to the reaction mixture to neutralize the catalyst and the product was fractionally distilled at 20 mm. Hg. The distillation results verified the analysis of the crude reaction mixture.

EXAMPLE XI t-Butylation of o-chlorophenol o-Chlorophenol (1050 g. total, 7.78 moles), containing 5 percent of zirconium o-cholorophenoxide was reacted with isobutylene during four hours at 140° C. and 35–45 p.s.i.g. The weight gain was 441 g. Gas chromatographic analysis of the final product showed o-chlorophenol, 6.7 percent; 2-t-butyl-6-chlorophenol, 80.7 percent; 4-t-butyl-2-chlorophenol, 1.1 percent; and 2,4-di-t-butyl-6-chlorophenol, 12.4 percent.

EXAMPLE XII

Styrenation of 1-naphthol

1-Naphthol (150 g. total, 1.0 mole), containing 5 percent by weight of zirconium naphtholate (made from zirconium tetrachloride) was stirred at 175° C. and 90.0 g. (0.865 mole) of styrene was added dropwise during one hour. Heating at 150–200° C. was continued for six hours. Gas chromatographic analysis of the final product showed 8.3 percent styrene, 4.3 percent styrene dimers, 22.0 percent 1-naphthol, and 65.4 percent 2-(α-methylbenzyl)-1-naphthol.

EXAMPLE XIII

*Styrenation of o-phenylphenol* o-Phenylphenol (100.0 g. total, 0.560 mole), containing 5 percent by weight of zirconium o-phenylphenoxide (made from the butoxide by distillation) was treated with 40.0 g. styrene (0.426 mole) at 150–180° C. during four hours. Gas chromatographic analysis showed styrene, 1.0 percent; p-phenylphenol, 17.1 percent; and 2-(α-methylbenzyl)-6-phenylphenol, 81.9 percent.

EXAMPLE XIV

*Ethylation of phenol*

Phenol (1125 g. total, 10.8 moles), containing 5 percent by weight of zirconium phenoxide was reacted with ethylene at 350° C. and 1000 p.s.i.g. during 12 hours. Gas chromatographic analysis of the final product indicated 1.3 percent unknown, 54.2 percent phenol, 33.7 percent o-ethylphenol, 7.2 percent 2,6-diethylphenol, and 3.6 percent higher boiling materials.

EXAMPLE XV

*Styrenation of phenol with hafnium phenoxide*

Hafnium oxychloride was prepared as follows (Bradley et al., J. Chem. Soc. 1953, pp. 1634–6). Ten grams of hafnium oxide was fused with 145 grams of potassium hydrogen sulfate. The melt was dissolved in farm water and filtered; 1.3 grams of unreacted $HfO_2$ was recovered. Hafnium hydroxide was precipitated from the solution by the addition of anhydrous ammonia. The gelatinous precipitate was filtered and washed with warm water. The wet solid was dissolved in a minimum amount of 37 percent HCl and the solution was evaporated to dryness on a steam bath. The solids so obtained were further dried at 105° C. to give 13.7 grams of $HfOCl_2 \cdot 8H_2O$.

A mixture of 3.5 grams of $HfOCl_2 \cdot 8H_2O$, 94 grams (1 mole) phenol and 50 ml. of xylene was refluxed with stirring until no more water was produced (Dean Stark trap). Enough xylene was then removed to give a pot temperature of 173° C. Heating was continued for 48 hours. The catalyst mixture (solids present) was cooled to 155° C. and 104 grams (1 mole) of styrene was added at 150–155° C. The reaction mixture was then heated to 180° C. during two hours and the first sample withdrawn. Additional samples were taken at 2.5 (197° C.), 3.0 (218° C.), and 3.5 hours, after completion of the addition, while the temperature rose to 235° C. After treatment with solid sodium carbonate and dilution with benzene, the samples were analyzed by vapor phase chromatography with the following results.

| Compound | Sample | | | |
|---|---|---|---|---|
| | 1 | 2 | 3 | 4 |
| | Reaction Time (Hours) (After Addition) | | | |
| | 2 | 2.5 | 3.0 | 3.5 |
| | Area Percent | | | |
| Styrene (includes xylene) | 34.5 | 24.3 | 17.2 | 8.9 |
| Phenol | 10.7 | 7.0 | 4.6 | 3.1 |
| o-(α-methylbenzyl)phenol | 46.4 | 54.1 | 58.4 | 60.5 |
| p-(α-methylbenzyl)phenol | 0 | 0 | 0 | 0 |
| 2,6-bis(α-methylbenzyl)phenol | 6.0 | 9.7 | 13.2 | 17.3 |
| 2,4-bis(α-methylbenzyl)phenol | 2.4 | 4.7 | 6.7 | 10.2 |

The o/p ratio was infinite, and the maximum ultimate yield of o-(α-methylbenzyl)-phenol by recycle was 78 percent, based on phenol.

EXAMPLE XVI

*Styrenation of phenol with Hafnium phenoxide*

A mixture of 94 grams (1 mole) of phenol, 3.5 grams of $HfOCl_2 \cdot 8H_2O$ (Example XV) and 50 ml. of xylene was refluxed with stirring for 16 hours while azeotropically removing the water formed. Most of the xylene was removed and the mixture was refluxed with stirring for an additional 24 hours under a slow stream of dry nitrogen. At 150–155° C., 100 grams (0.96 mole) of styrene was added. The reaction mixture was heated to 160° C. during two hours and the first sample taken. Additional samples were taken at 4.5 (170° C.), 6.5 (179° C.) and 8 hours while the temperature rose to 185° C. The samples were treated with solid sodium carbonate, diluted with benzene and analyzed by vapor phase chromatography.

| Compound | Sample | | | |
|---|---|---|---|---|
| | 1 | 2 | 3 | 4 |
| | Reaction Time (Hours) (After Addition) | | | |
| | 2 | 4.5 | 6.5 | 8.0 |
| | Area Percent | | | |
| Xylene | 4.2 | 4.9 | 4.3 | 4.7 |
| Styrene | 41.8 | 20.9 | 23.8 | 18.0 |
| Phenol | 32.1 | 24.7 | 24.4 | 21.8 |
| o-(α-methylbenzyl)phenol | 22.0 | 37.0 | 45.1 | 52.3 |
| p-(α-methylbenzyl)phenol | (1) | (1) | (1) | (1) |
| 2,6-bis(α-methylbenzyl)phenol | | 2.5 | 2.4 | 3.3 |
| 2,4-bis(α-methylbenzyl)phenol | | | | |

[1] Trace—not measurable.

The o/p ratio approached infinite and the maximum ultimate yield of o-(α-methylbenzyl)phenol by recycle was 96 percent, based on phenol.

EXAMPLE XVII

*Styrenation of phenol with niobium phenoxide*

A solution of 94 grams of phenol, 2.3 grams of niobium pentachloride and 50 ml. of toluene was refluxed with stirring while water was removed azeotropically via a Dean Stark trap. Most of the toluene was removed and refluxing was continued for 24 hours while dry nitrogen was bubbled through the solution. Styrene, 100 grams (0.96 mole) was added at 145–150° C. and heating was continued to 185° C. during two hours and the first sample taken. Additional samples were taken at 2.5 (208° C.), 3.0 (222° C.), and 4.5 hours while the temperature rose to 228° C. After treatment with solid sodium carbonate and dilution with benzene, vapor phase chromatography analysis of the samples showed:

| Compound | Sample | | | |
|---|---|---|---|---|
| | 1 | 2 | 3 | 4 |
| | Reaction Time (Hours) (After Addition) | | | |
| | 2 | 2.5 | 3.0 | 4.5 |
| | Area Percent | | | |
| Toluene | 3.8 | 3.2 | 2.8 | 2.2 |
| Styrene | 18.4 | 6.8 | 2.6 | 0.2 |
| Phenol | 18.8 | 15.5 | 12.1 | 10.0 |
| o-(α-methylbenzyl)phenol | 44.4 | 54.8 | 58.8 | 60.1 |
| p-(α-methylbenzyl)phenol | 0 | 0 | 0 | 0 |
| 2,6-bis(α-methylbenzyl)phenol (Includes trace amounts of 2,4 isomer) | 14.6 | 19.6 | 23.7 | 26.1 |

The o/p ratio was infinite and the maximum ultimate yield of o-(α-methylbenzyl)phenol by recycle was 78 percent, based on phenol.

EXAMPLE XVIII

*Styrenation of phenol with niobium phenoxide*

A mixture of 100 grams phenol and 20 grams toluene was azeotroped to give one drop of water (<0.1 ml.) along with 15.3 toluene. After cooling, 2.7 grams (0.01 mole) of niobium pentachloride (K & K Laboratories) was added and hydrogen chloride was evolved immediately so that some escaped. The mixture was refluxed 7 hours under slight nitrogen pressure which was allowed to escape through the condenser, an attached Drierite-filled drying tube and a water-filled bubbler. The mixture was stirred and heated to 144° C. and 100 grams styrene was added during 15 minutes while the temperature dropped to 132° C. Heating was continued for two hours while the temperature rose to 154° C. It was cooled overnight and reheated to 160–187° C. for six hours the following day. The reaction product on analysis by vapor phase chromatography showed 0.1 percent styrene, 13.1 percent phenol, 70.6 percent o-(α-methylbenzyl)phenol and 16.2 percent 2,6-bis(α-methylbenzyl)phenol. The o/p ratio was infinite and the maximum ultimate yield of o-(α-methylbenzyl)phenol by recycle was 87 percent, based on phenol.

EXAMPLE XIX

*Styrenation of phenol with tantalum phenoxide*

A solution of 94 grams (1 mole) of synthetic phenol, 2.6 grams of tantalum pentachloride and 50 ml. of benzene was refluxed with stirring and water was removed via a Dean Stark trap. Benzene was removed and the solution was refluxed for 48 hours in the presence of dry nitrogen. The reaction mixture was cooled to 160° C. and 104 grams (1 mole) of styrene was added. The mixture was heated to 246° C. during 0.5 hour and the first sample withdrawn. Additional samples were taken at 1.0 and 1.5 hours, after completion of the addition, with the temperature held at 247° C. After treatment with solid sodium carbonate and dilution with benzene, the samples were analyzed by vapor phase chromatography with the following results:

| Compound | Sample | | |
|---|---|---|---|
| | 1 | 2 | 3 |
| | Reaction Time (Hours) (After Addition) | | |
| | 0.5 | 1.0 | 1.5 |
| | Area Percent | | |
| Styrene | 2.1 | Trace | Trace |
| Phenol | 12.4 | 12.4 | 13.8 |
| o-(α-methylbenzyl)phenol | 65.3 | 64.3 | 61.5 |
| p-(α-methylbenzyl)phenol | 0 | 0 | 0 |
| 2,6-bis(α-methylbenzyl)phenol | 20.2 | 23.5 | 24.7 |

The o/p ratio was infinite and the maximum ultimate yield of o-(α-methylbenzyl)phenol by recycle was 80 percent, based on phenol.

EXAMPLE XX

*Styrenation of phenol with tantalum phenoxide*

A solution of 94 grams of phenol, 2.6 grams of TaCl₅ and 50 ml. of toluene was refluxed with stirring and water was removed azeotropically. Most of the toluene was removed and refluxing was continued for 24 hours while dry nitrogen was bubbled through the reaction mixture. Styrene, 100 grams was added at 155–160° C. The mixture was heated to 239° C. during 0.5 hour and a sample taken. Samples were also taken after one hour with the temperature at 254° C. and 2.0 hour, when the temperature had fallen to 250° C. After treatment with sodium carbonate and dilution with benzene, the samples upon analysis by vapor phase chromatography gave the following results:

| Compound | Sample | | |
|---|---|---|---|
| | 1 | 2 | 3 |
| | Reaction Time (Hours) (After Addition) | | |
| | 0.5 | 1.0 | 2.0 |
| | Area Percent | | |
| Styrene | 0.6 | 0.6 | Trace |
| Phenol | 5.6 | 9.4 | 10.2 |
| o-(α-methylbenzyl)phenol | 68.8 | 56.0 | 60.8 |
| p-(α-methylbenzyl)phenol | 0 | 0 | 0 |
| 2,6-bis(α-methylbenzyl)phenol | 25.0 | 34.1 | 29.0 |

The o/p ratio was infinite and the maximum ultimate yield of o-(α-methylbenzyl)phenol by recycle was 80 percent, based on phenol.

EXAMPLE XXI

*Styrenation of phenol with vanadium phenoxide*

One mole, 94.1 grams, of phenol, 1.2 grams of vanadium trichloride (City Chemical Corporation), and 50 ml. of benzene were refluxed azeotropically until 0.2 ml. of water had been removed. Next, the benzene was distilled off to a final pot temperature of 160° C. The refluxing was continued for 4.5 hours in the presence of a stream of nitrogen during which time the pot temperature rose to 180° C. The final vapors gave a negative test for hydrogen chloride when tested with aqueous ammonia. Next, 104.0 grams (1.0 mole) of styrene was added during seventeen minutes starting at 150° C. and ending at 119° C. Heating was continued. The reaction mixture was heated to 161° C. during 3.0 hours and a sample taken. Heating continued and the temperature rose to 162° C. during an additional 0.67 hour. The samples were treated and analyzed by vapor phase chromatography. The results are as follows:

| Compound | Sample | |
|---|---|---|
| | 1 | 2 |
| | Reaction Time (Hours) (After Addition) | |
| | 3.0 | 3.67 |
| | Area Percent | |
| Styrene | 46.1 | 45.6 |
| Phenol | 39.5 | 36.5 |
| o-(α-methylbenzyl)phenol | 9.3 | 9.5 |
| p-(α-methylbenzyl)phenol | 5.1 | 8.1 |
| 2,6- and 2,4-bis(α-methylbenzyl)phenol | | |

It is thus seen that vanadium phenoxide is ineffective as an ortho-alkylation catalyst.

As can be seen from the foregoing examples, the desired product can be recovered from the reaction mixture by a number of different methods. The catalyst may be inactivated by neutralization with the required amount of base. The base may be added per se as an aqueous solution. If desired, filtration of the resultant solid or separation of an aqueous layer may be carried out, but it is not necessary to do so. The catalyst may also be hydrolyzed by the addition of water, followed, if desired, by filtration or separation by aqueous acid, followed by separation of the layer.

The product can also be isolated by removing the reaction mixture from the catalyst by fractional distillation or by flash distillation followed by fractional distillation.

Still another means of isolating the desired product is to add sufficient base to the reaction mixture to neutralize the catalyst and to convert the unhindered phenols contained in the product to their salts. This can be followed by extraction of the desired compound or compounds with organic, water-immiscible solvents or by steam distillation followed by separation of the layer, extraction of the product or distillation.

I claim:

1. In a process for the selective catalytic ortho-alkylation of a hydroxyaromatic hydrocarbon containing at least one reactive hydrogen in a position ortho- to a hydroxyl group wherein said hydroxyaromatic hydrocarbon is reacted with an olefin at an elevated temperature and a pressure up to 3000 p.s.i.g., the improvement comprising conducting the reaction in the presence of a catalytic amount of an aryloxide of a metal selected from the group consisting of the fifth and sixth periods of the Groups IV–B and V–B metals of the Periodic Table.

2. A process for the selective catalytic ortho-alkylation of a hydroxyaromatic hydrocarbon containing at least one reactive hydrogen in a position ortho- to a hydroxyl group, comprising reacting said hydroxyaromatic hydrocarbon with 0.3–2.5 moles, based on the number of moles of hydroxyaromatic hydrocarbon of an olefin having up to 20 carbon atoms at a temperature of 50–400° C. at a pressure of up to 3000 p.s.i.g. in the presence of 0.2 to 10 mole percent, based on the number of moles of hydroxyaromatic hydrocarbon of an aryloxide selected from the group consisting of phenoxides, lower alkylphenoxides, hydroxyphenoxides and halophenoxides of a metal selected from the group consisting of fifth and sixth periods of the Group IV–B and Group V–B metals of the Periodic Table.

3. The process of claim 2 wherein the hydroxyaromatic hydrocarbon is phenol.

4. The process of claim 2 wherein the hydroxyaromatic hydrocarbon is cresol.

5. The process of claim 3 in which the aryloxide is zirconium phenoxide.

6. The process of claim 3 in which the aryloxide is niobium phenoxide.

7. The process of claim 3 in which the aryloxide is hafnium phenoxide.

8. The process of claim 3 in which the aryloxide is tantalum phenoxide.

References Cited

UNITED STATES PATENTS

| 2,480,254 | 8/1949 | Mavity | 260—624 |
| 2,831,898 | 4/1958 | Ecke et al. | 260—624 |

FOREIGN PATENTS

| 1,289,060 | 2/1962 | France. |

LEON ZITVER, *Primary Examiner.*

W. B. LONE, *Assistant Examiner.*